Nov. 19, 1963  G. F. W. POWELL  3,111,026
TOBACCO-MANIPULATING MACHINES
Filed Nov. 25, 1960  2 Sheets-Sheet 1

INVENTOR
Gordon F.W. Powell
BY
Watson, Cole, Grindle & Watson
ATTORNEYS

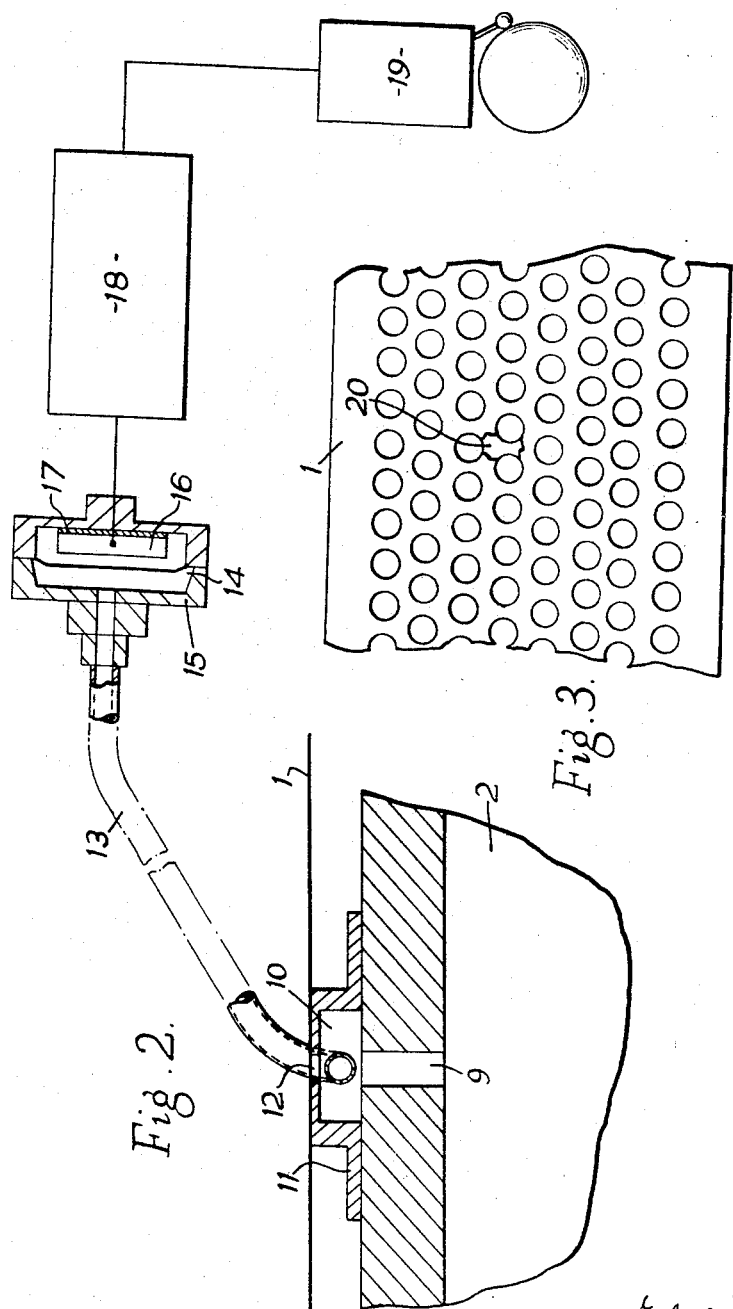

United States Patent Office 3,111,026
Patented Nov. 19, 1963

3,111,026
TOBACCO-MANIPULATING MACHINES
Gordon Francis Wellington Powell, Deptford, London, England, assignor to Molins Machine Company Limited, a British company
Filed Nov. 25, 1960, Ser. No. 71,820
Claims priority, application Great Britain Dec. 1, 1959
2 Claims. (Cl. 73—38)

This invention concerns improvements in or relating to a continuous rod cigarette-making machine, wherein a continuous tobacco filler is conveyed on an air-permeable conveyor, being retained thereon by a stream of air passing through the filler and the conveyor. The filler may initially have been carried in the air stream and deposited from it as the air passes through the air-permeable conveyor. Such a machine will be referred to as "a tobacco-manipulating machine as set forth."

An example of such a machine is disclosed in United States Patent No. 3,030,965, granted April 24, 1962, in which suction means draw air through an air-permeable conveyor consisting of a moving perforated metal conveyor band, some of the air being drawn through the band from a passage into which cut tobacco is introduced to be carried by the air onto the band to form a continuous tobacco filler. As the conveyor moves away from the passage, the filler is retained on the conveyor by the action of atmospheric air being drawn through the filler and the conveyor by the suction means. In such a machine it is highly desirable that the air-permeability of the conveyor should be substantially uniform along its length for, in a case with the air-permeability of the conveyor deliberately varied at definite positions along its length e.g. for the purpose of deliberately densifying the filler more at these positions than elsewhere, the air-permeability of the conveyor should be uniform along any length which is intended to carry a filler of a definite uniform density. A variation in the air-permeability of one part of the conveyor from the air-permeability of the rest of the conveyor may cause a variation in the quantity of air drawn to that part and hence in the quantity of tobacco deposited on that same part of the conveyor. Moreover, not only in this passage, but also between the position where the filler leaves the passage and the position where it starts to form into a continuous cigarette rod, the filler is held onto the conveyor suctionally (for example the suction force may be sufficient to compress the filler to about one half its final density). Any undesired variation in air-permeability of the conveyor at this stage will tend to cause a corresponding undesired variation in the density of the tobacco in the filler, such density variation being extremely difficult to rectify at a later stage in the machine. Consequently it is considered desirable that as soon as any such undesired variation occurs in the air-permeability of the moving conveyor, whether in the form of decreased permeability due to clogging up of perforation, or of increased permeability due perhaps (in the case of a perforated metal conveyor band) to small pieces of metal breaking from the conveyor, suitable warning should be given so that the conveyor can be cleaned or changed as may be necessary.

The said changes in a characteristic of the airflow may be utilized to change the capacitance of a capacitor, a specific change in which capacitance actuates the said signal.

Further according to the invention there is provided detector means for detecting undesired changes in the air-permeability of the moving air-permeable conveyor or of a part thereof, comprising means operative at a position through which the conveyor-surface passes when it is not carrying the tobacco filler.

The apparatus may include sensing means wherein a change in the value of the air-permeability of a part of the said moving conveying surface is sensed as a change in the value of a physical characteristic e.g. air pressure and comprising means wherein a specific change in the said physical characteristic is utilised to actuate a signal, e.g. to operate a warning signal. The apparatus may comprise a chamber having an opening adjacent the conveyor, and means to pass air through the conveyor and the chamber, whereby a variation in air-permeability of part of the conveyor causes a variation in air pressure in the chamber. The said chamber may communicate with one side of a further chamber, the other side of which is separated from the first side by a metal diaphragm, the first said chamber having two openings, one having the moving conveying surface running past it and the other being connected to an air pressure source maintained at a substantially constant pressure other than atmospheric pressure, the two openings cooperating so that a change in air permeability of that part of the moving conveying surface instantaneously in line with the one opening causes a change in pressure within the first said chamber which change causes the diaphragm in the said further chamber to move to a different position. The pressure-drops along the two openings in the said air chamber may be substantially equal.

The apparatus may comprise a capacitor, one plate of which is fixed and the other of which is the said diaphragm and is movable so that a change in air pressure on the diaphragm causes a change in the capacitance of the capacitor, which change in capacitance is used to trigger an electronic device for operating the said warning.

One embodiment of the invention will now be described by way of example, with reference to the accompanying drawings, of which:

FIGURE 2 shows part of FIGURE 1 to a larger scale and partly in section; and

FIGURE 3 shows a detail.

Figure 1:
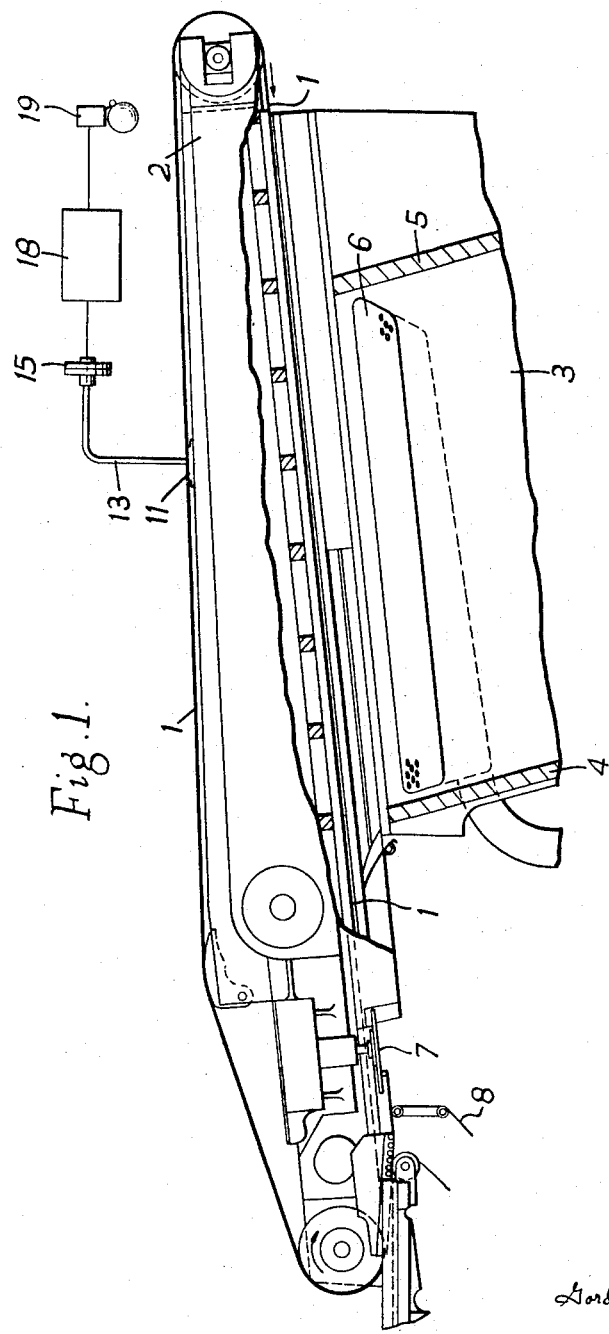
FIGURE 1 shows part of a continuous rod cigarette-making machine in side elevation and partly in section.

The apparatus shown in FIGURES 1 and 2 forms part of a continuous rod cigarette-making machine basically similar to that disclosed in the abovementioned specification.

Referring to FIGURE 1, the apparatus comprises a perforated metal conveyor band 1 arranged to move, in the direction shown by the arrow, beneath a suction chamber 2 which draws air upwardly through the conveyor band.

A portion of the band 1 is shown in FIGURE 3 and is similar to that disclosed in the abovementioned specification. The band is 9 mm. wide and has 700 holes per square icnh, the holes having a diameter of 26 to 28 thousandths of an inch.

A passage formed by side walls 3 and end walls 4 and 5 extends upwardly to the band 1. Means (not shown) are provided to supply air to the lower end of the passage, and the arrangement is such that air flows up the passage in a continuous stream at high velocity. Tobacco-feeding means (not shown) are arranged to feed tobacco particles into the passage in such a way that they are impelled upwardly to the band 1 by the airstream, and build up on the band to form a filler.

Some of the air which flows up the passage is drawn off through a perforated, louvred plate 6 by suction means.

Both the band 1 and the suction chamber 2 extend a substantial distance beyond the end wall 4 of the passage, that is, to the left of the wall 4 as viewed in FIGURE 1, and air is drawn through that part of the band from atmosphere. This enables the tobacco filler which has been built up on the band in the passage to be held suctionally on the underside of the band 1. A trimming device is provided to remove surplus tobacco from the tobacco filler. This device comprises a pair of cooperating discs 7 (one of which is visible in FIGURE 1) arranged beneath the band 1. Beyond the trimming device, the band 1 extends over a paper web 8, on to which the tobacco filler is led while still suctionally held on the band 1; when suction is cut off from the band, the filler is released and is thereafter transferred to and conveyed by the paper web, which is then wrapped around it to form a continuous wrapped rod.

The trimming discs 7 may be controlled to move towards or away from the band 1 to remove more or less tobacco therefrom in response to variations in the air permeability of the filler. For example, as described in copending application Serial No. 839,639, filed September 14, 1959, air may be drawn through the filler and the band 1 and through a chamber, and variations in air pressure occurring in that chamber due to variations in the air permeability of the filler (and band) are utilised to control the position of the trimming discs. Therefore a variation in permeability of the band will introduce a source of error into the pressure signal which determines the position of the trimming discs 7.

To detect any variations in the permeability of the band 1 the following arrangement is adopted. The top of the suction chamber 2 is provided with a small opening 9 about midway along and a chamber 10 is formed above this aperture by a member 11 of "top hat" section. An opening 12 is provided in the top of the member 11 and it is arranged that the return length of the band runs over the top of the member 11 and in register with the opening 12 which has a dimension perpendicular to the plate of the drawing equal to the width of the band. A pipe 13 communicates with the interior of member 11 and with one side of a metal diaphragm 14 provided in a chamber 15. At the other side of the diaphragm 14 the chamber 15 carries a metal disc 16 which is insulated from the wall of the chamber by a disc 17. The diaphragm 14 and the disc 16 thus form a capacitor which is connected to a capacitance change detector of known form acting as a trigger device operated by thyratron or other similar known device. The output of the trigger device is connected to a warning device such as a bell 19.

Air is drawn from atmosphere through the part of the band 1 at any instant in register with the opening 12 into the chamber 10 and from this chamber through the opening 9 into the suction chamber 2. The size of the opening 9 is chosen so that it causes about the same pressure drop as the opening 12 with the band 1 running over it. So long as the permeability of the band is unvarying a steady suctional pressure will be maintained in chamber 10 and the diaphragm 14 will be deflected to the left as shown in FIGURE 2, so producing a definite capacitance value with the metal disc 16. Should there be a portion of the band with a different permeability there will be a change in pressure in the chamber 10 when this part of the band comes into line with the opening 12 and consequently a deflection of the diaphragm 14 resulting in a change of capacitance which will be detected by the device 18. If this variation is large enough the alarm bell 19 will be rung to indicate to the operator of the machine that there is a defect in the band. It is arranged that only variations of at least a specifically chosen magnitude will actuate the relay and ring the bell. The response time of the diaphragm 14 and the capacitance change detector is suitably chosen so that defects in the band can be detected at high band speeds.

The variation in permeability of the band 1 may be due to a piece of the band breaking away, resulting in an increase in electrical capacitance between the diaphragm 14 and disc 16, e.g. as shown in FIGURE 3, a piece such as 20 may break away due to cracks forming between three adjacent holes. Variation in permeability may also be due to clogging up of the holes in the band 1. This may be particularly prevalent when cased tobacco is used. In this event the diaphragm 14 will move to the left as seen in FIGURE 2 with a decrease in capacitance. The detector device 18 can be suitably arranged so as to respond to both increases and decreases in capacitance.

Although the invention has been described in relation to an air-pervious conveyor in the form of a perforated metal conveyor band it will be appreciated that the conveyor need not be in the form of a band. It is, however, essential for the operation of the invention that the conveyor, in whatever form it may take, must be moving and moving at normal machine operating speeds.

What I claim as my invention and desire to secure by Letters Patent is:

1. A continuous rod cigarette making machine in which a continuous tobacco filler is formed, comprising an endless air pervious conveyor having a forward run to convey the filler lengthwise and a return run, a suction chamber in communication with the forward run of the conveyor to draw air into the suction chamber through the conveyor to hold the filler to the conveyor, means defining a first aperture in the suction chamber remote from the forward run of the conveyor, and through which air is also drawn into the suction chamber, a further chamber in air sealing communication with the means defining the first aperture, means defining a second aperture in the further chamber, the further chamber being located in relation to the return run of the conveyor so that one side of the conveyor runs in contact with the means defining the second aperture so that air drawn through the first aperture first passes through the conveyor, the second aperture and the further chamber, air-pressure responsive means in communication with the further chamber and acting to produce an electrical signal on a predetermined change of air pressure in said further chamber, and a warning device responsive to the electrical signal.

2. A machine as claimed in claim 1 wherein the air-pressure responsive means comprises a capacitor having two plates, one plate being fixed and the other plate being a pressure sensitive diaphragm to which the air pressure in the further chamber is applied so that a change in the pressure moves the diaphragm and causes a change in the capacitance of the capacitor, which change produces the electrical signal.

References Cited in the file of this patent
UNITED STATES PATENTS

| | | |
|---|---|---|
| 1,604,138 | Vidaver | Oct. 26, 1926 |
| 2,594,138 | Elam | Apr. 22, 1952 |
| 2,694,911 | Peck | Nov. 23, 1954 |